(12) United States Patent
Olson et al.

(10) Patent No.: US 8,935,920 B2
(45) Date of Patent: Jan. 20, 2015

(54) HYDROSTATIC DRIVE FOR A MACHINE

(75) Inventors: Thomas J. Olson, Dayton, MN (US); Andrew R. Torkelson, St. Louis Park, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 628 days.

(21) Appl. No.: 13/291,507

(22) Filed: Nov. 8, 2011

(65) Prior Publication Data
US 2013/0115014 A1 May 9, 2013

(51) Int. Cl.
| | |
|---|---|
| F15B 13/06 | (2006.01) |
| H04L 12/18 | (2006.01) |
| E02D 3/02 | (2006.01) |
| F15B 13/07 | (2006.01) |
| F15B 7/00 | (2006.01) |
| F16H 61/4078 | (2010.01) |
| F16H 61/448 | (2010.01) |

(52) U.S. Cl.
CPC ............... *H04L 12/189* (2013.01); *E02D 3/02* (2013.01); *F15B 13/06* (2013.01); *F15B 13/07* (2013.01); *F15B 7/006* (2013.01); *F15B 7/008* (2013.01); *F16H 61/4078* (2013.01); *F16H 61/448* (2013.01); *F15B 2211/20546* (2013.01); *F15B 2211/20561* (2013.01); *F15B 2211/20576* (2013.01); *F15B 2211/7058* (2013.01); *B60Y 2200/413* (2013.01)
USPC .............................................. 60/487; 60/490

(58) Field of Classification Search
CPC ................... F15B 13/0807; F15B 2211/7058; F16H 61/4078; B60Y 2200/413
USPC .............................. 60/484, 487, 490; 56/11.9
See application file for complete search history.

(56) References Cited

U.S. PATENT DOCUMENTS

| | | | |
|---|---|---|---|
| 3,748,851 A | 7/1973 | Hause | |
| 4,168,757 A | 9/1979 | Mather et al. | |
| 4,606,428 A * | 8/1986 | Giere | 60/484 |
| 4,888,949 A * | 12/1989 | Rogers | 60/487 |
| 5,924,509 A * | 7/1999 | Ferguson et al. | 180/307 |
| 6,408,972 B1 * | 6/2002 | Rodgers et al. | 180/305 |
| 6,416,373 B1 | 7/2002 | Kolb et al. | |
| 6,481,202 B1 | 11/2002 | Zuehlke et al. | |
| 6,860,106 B2 | 3/2005 | Takada et al. | |
| 6,993,906 B1 | 2/2006 | Smothers et al. | |
| 7,455,132 B2 | 11/2008 | Acharya et al. | |
| 7,523,611 B2 | 4/2009 | Dong et al. | |
| 7,739,870 B2 | 6/2010 | Carlson et al. | |
| 7,967,099 B2 * | 6/2011 | Fausch | 180/307 |
| 2008/0110698 A1 | 5/2008 | Hammes | |

FOREIGN PATENT DOCUMENTS

| | | |
|---|---|---|
| JP | 11078589 | 3/1999 |
| WO | 2006014337 | 2/2006 |

* cited by examiner

*Primary Examiner* — Thomas E Lazo
(74) *Attorney, Agent, or Firm* — Andrew A. Phillips; Joseph E. Reed (57) ABSTRACT

A hydrostatic drive including a hydrostatic pump configured to supply a transmission fluid. The hydrostatic drive further includes an axle motor and a drum motor. The axle motor is configured to drive a set of traction wheels and the drum motor is configured to drive a drum. The hydrostatic drive also includes an axle drive line and a drum drive line. The axle drive line and the drum drive line are connected to the axle motor and the drum motor respectively to supply the transmission fluid. A manifold integrally connected to the hydrostatic pump to operatively couple the axle drive line and the drum drive line with the hydrostatic pump.

16 Claims, 5 Drawing Sheets

HYDROSTATIC DRIVE FOR A MACHINE

TECHNICAL FIELD

The present disclosure relates to a machine, and particularly to a hydrostatic drive for the machine.

BACKGROUND

Machines for compacting soil or asphalt having a compacting member like a drum are well known in the art. Such machines use a hydrostatic drive with means for distribution of transmission fluid between the compacting member and a set of traction wheels. Typically, the hydrostatic drive includes a hydrostatic pump to which drive lines from the compacting member and the set of wheels are remotely connected via a manifold.

U.S. Pat. No. 7,523,611 discloses a hydrostatic transmission including a pump and a motor. The hydraulic transmission further includes an external manifold extending between and connecting the pump to the motor. The external manifold includes two conduits that connect ports in the pump to ports in the motor for supplying a hydraulic fluid between the pump and the motor.

SUMMARY

In one aspect, the present disclosure provides a hydrostatic drive including a hydrostatic pump. The hydrostatic pump is configured to supply a transmission fluid. The hydrostatic drive further includes an axle motor configured to drive an axle and a drum motor configured to drive a drum. An axle drive line is connected to the axle motor and a drum drive line connected to the drum motor to supply the transmission fluid from the hydrostatic pump. A manifold is integrally connected to the hydrostatic pump. The manifold is configured to operatively couple the axle drive line and the drum drive line with the hydrostatic pump.

In another aspect, the present disclosure provides a machine. The machine includes the axle motor connected to the axle which drives a set of traction wheels and the drum motor drivingly connected to the drum. The machine also includes the hydrostatic pump configured to supply the transmission fluid. The machine further includes the axle drive line connected to the axle motor and the drum drive line connected to the drum motor for supplying the transmission fluid from the hydrostatic pump. Further, the machine includes the manifold integrally connected to the hydrostatic pump. The manifold is configured to operatively couple the axle drive line and the drum drive line with the hydrostatic pump. The machine further includes a plug orifice configured to exchange the transmission fluid between the axle drive line and the drum drive line based on a difference in pressure.

In yet another aspect, the present disclosure provides a method for speed synchronization between the drum motor and the axle motor. The method includes connecting the manifold, integrally, with the hydrostatic pump. The manifold is connected to form at least a portion of a housing of the hydrostatic pump. The method also includes coupling the drum drive line and the axle drive line to the manifold. Further, the method includes providing the plug orifice in the manifold to enable an exchange of the transmission fluid between the axle drive line and the drum drive line.

Other features and aspects of this disclosure will be apparent from the following description and the accompanying drawings.

DETAILED DESCRIPTION

Figure 1:
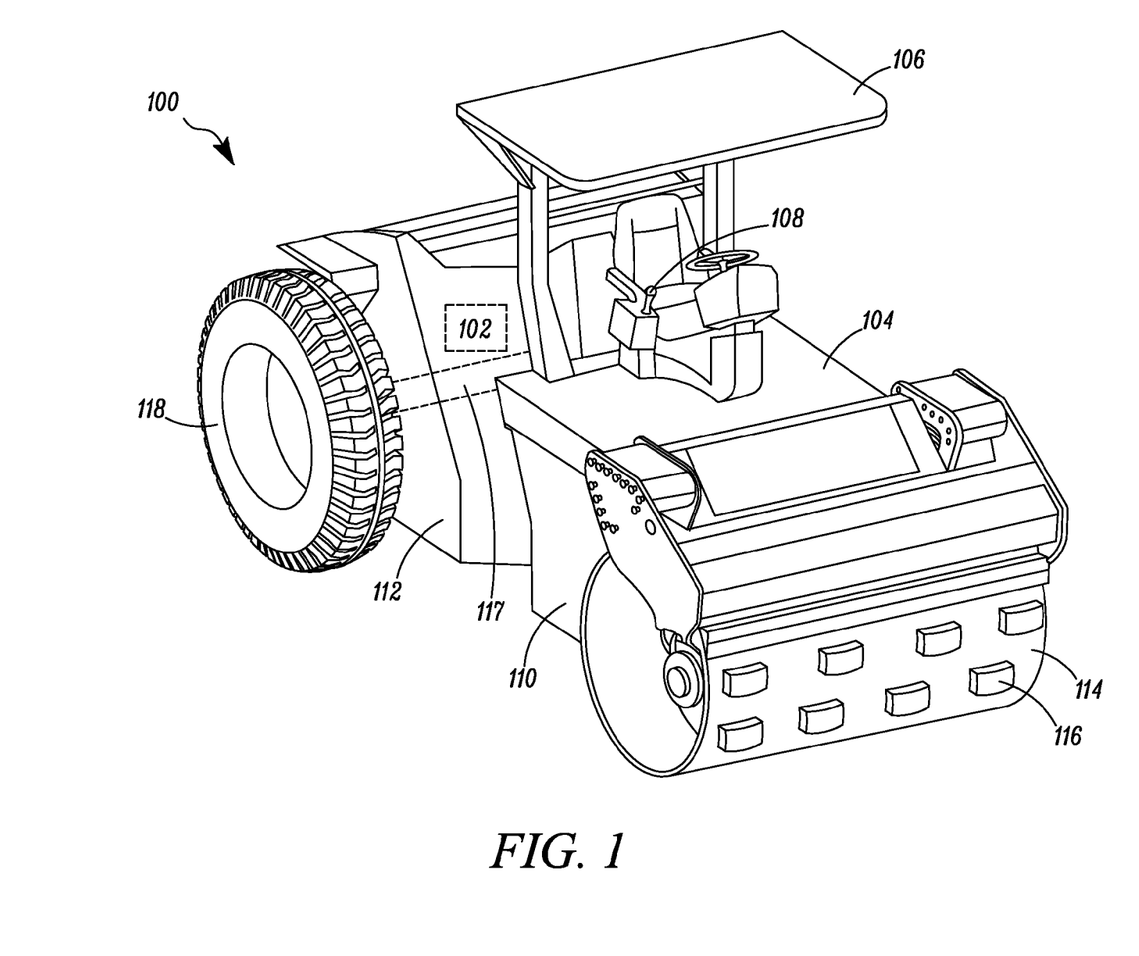
FIG. 1 illustrates a perspective view of a machine.

The present disclosure will now be described in detail with reference being made to accompanying figures. A machine 100 in which various disclosed embodiments may be implemented is schematically illustrated in FIG. 1. As illustrated, the machine 100 embodies a compactor such as a soil compactor, a landfill compactor, a vibratory soil compactor, a vibratory asphalt compactor, a pneumatic tire compactor or the like. However, it may be contemplated, the machine 100 of the present disclosure may be any type of earth working machine with a varying transmission between a front and a rear drive.

The machine 100 includes a power source 102 driving the various components. The power source 102 may be an internal combustion engine like petrol engine or a diesel engine, an electrical source like a series of batteries, etc. The machine 100 provides a chassis 104 to support various structures. The machine 100 may further include an operator station 106 defined in the form of an enclosure in the chassis 104. The operator station 106 may include one or more controls 108 to control the various machine operations. Further, the chassis 104 may include a front section 110 and a rear section 112.

Inherently, the machine 100 includes a drum 114 supported by the chassis 104. The drum 114 may be in the shape of a roller rotatably supported by the front section 110 in the machine 100. In an embodiment, the drum 114 may be of pad-foot type with a plurality of segmented pads 116 disposed over the surface. Further, the machine 100 may include an axle 117 driving a set of traction wheels 118 mounted on the rear section 112. Typically, the machine 100 is configured to have a rolling radius $R_d$ of the drum 114 and a rolling radius $R_w$ of the set of traction wheels 118 to be equivalent. Together, the drum 114 and the set of traction wheels 118 act as the ground engaging member for the machine 100.

Figure 2:
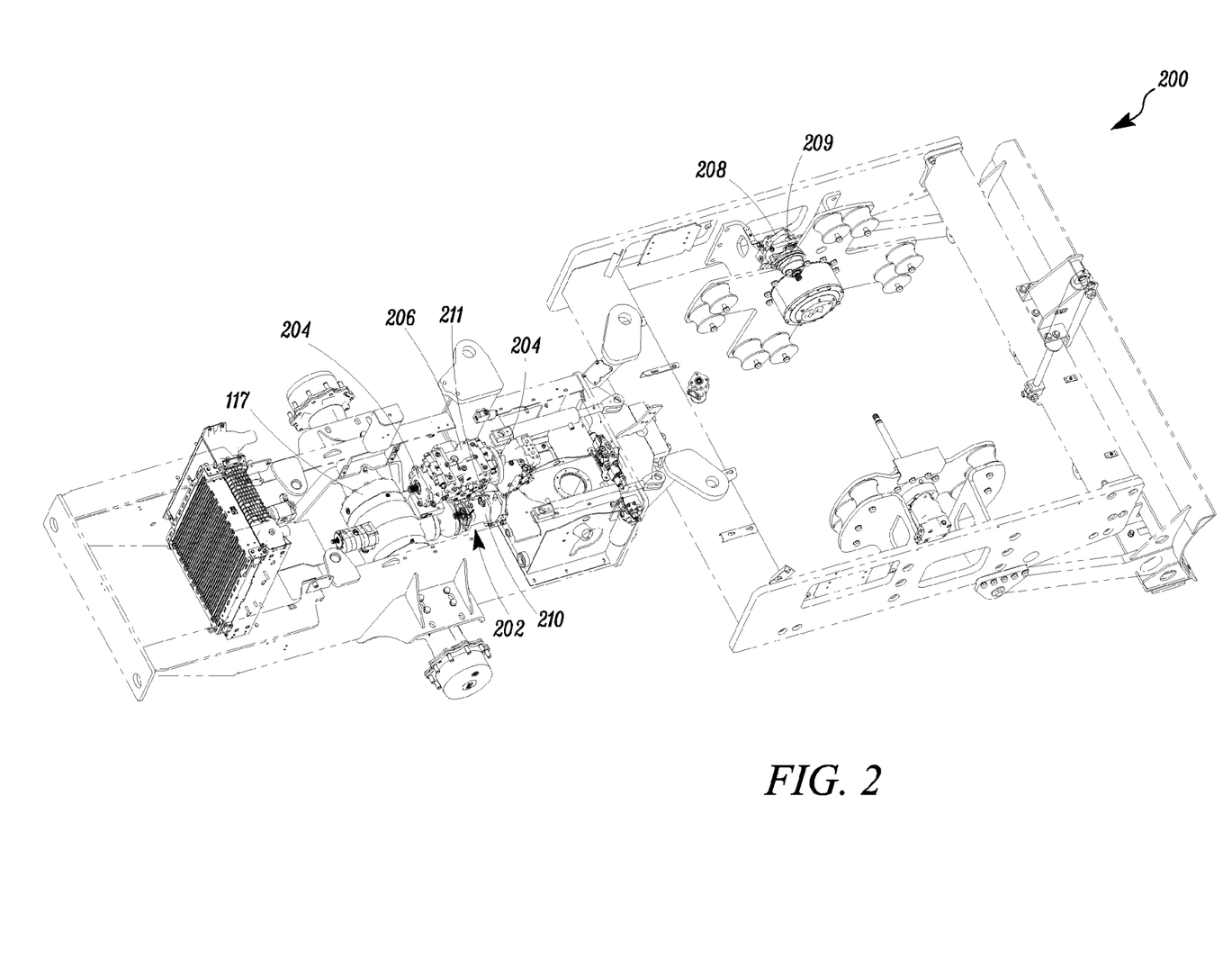
FIG. 2 illustrates a diagrammatic view of a hydrostatic drive for the machine of FIG. 1, according to an embodiment.

FIG. 2 illustrates a hydrostatic drive 200 for the machine 100, according to an embodiment. The hydrostatic drive 200 of the present disclosure is a closed loop hydraulic circuit supplying a transmission fluid for driving various components. The hydrostatic drive 200 includes a hydrostatic pump 202 which may be a power driven hydraulic bi-directional pump. The hydrostatic pump 202 may be a variable flow piston pump, a rotary pump like a gear pump, screw pump, vane pump, etc. However, the type of pump is not germane to the invention and, therefore, any suitable type of pump may be used in accordance with the disclosure.

In an embodiment of the present disclosure, the hydrostatic pump 202 may include two rotary groups 204 disposed in a housing 206. The hydrostatic pump 202 may be driven by the power source 102 in the machine 100. In an embodiment, each of the rotary group of the two rotary groups 204 may have the controls 108 independent of each other. The controls 108 may use operator command to determine an electric current sent to the hydrostatic pump 202, which in turn defines the displacement of the two rotary groups 204 in the hydrostatic pump 202. In other embodiment, mechanical or hydraulic control means may also be used.

The hydrostatic drive 200 may include two hydraulic motors, a drum motor 208 and an axle motor 210. The hydraulic motors may be any one of a radial motor, an axial motor, a gear and vane motor or the like. The drum motor 208 is drivingly connected to the drum 114. Similarly, the axle motor 210 is drivingly connected to the axle 117, which in turn may drive the set of traction wheels 118. In an embodiment, the drum motor 208 may be associated with a drum motor speed sensor 209 and the axle motor 210 may be similarly associated with an axle motor speed sensor 211. The drum motor speed sensor 209 and the axle motor speed sensor 211 may be configured to provide a speed signal indicative of the speed of the drum motor 208 and the axle motor 210 respectively.

Figure 3:
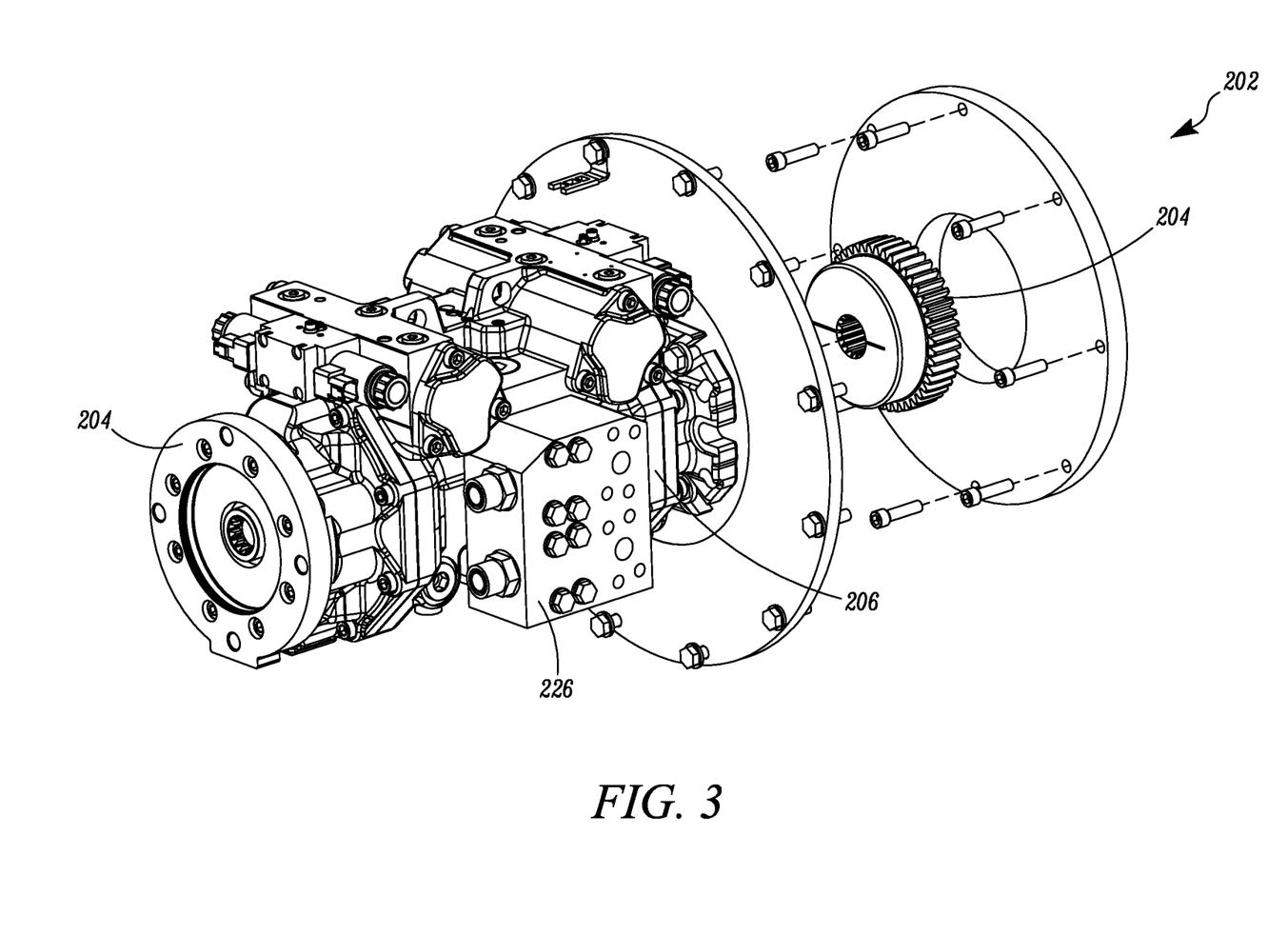
FIG. 3 illustrates a perspective view of a hydrostatic pump with two rotary groups.
Figure 4:
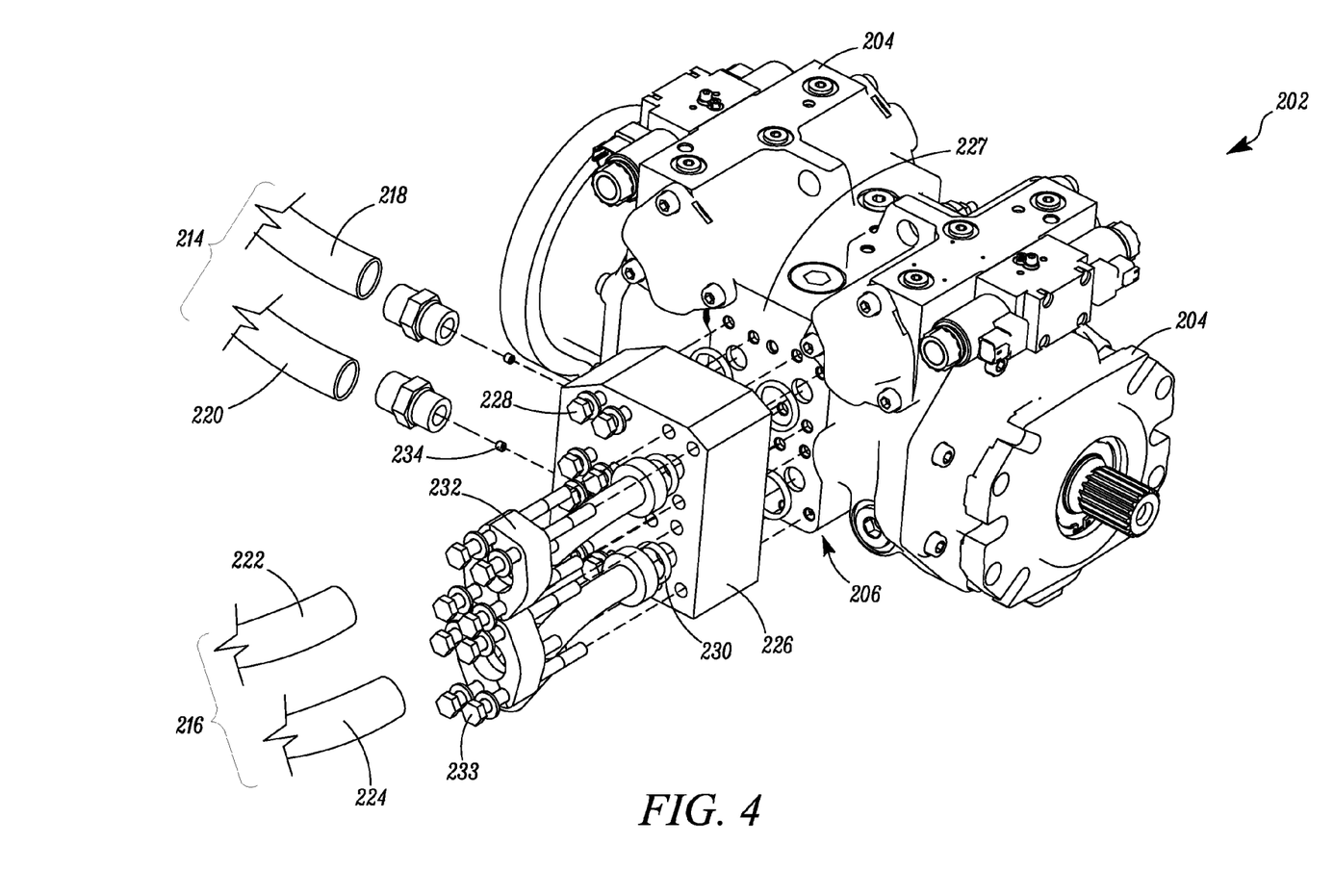
FIG. 4 illustrates a perspective view of a hydrostatic pump with a manifold.

Referring now to FIG. 3 and FIG. 4 in general, different perspective views of the hydrostatic pump 202 is illustrated. In the hydrostatic drive 200, each of the rotary group of the two rotary groups 204 is configured to drive either one of the drum motor 208 or the axle motor 210. The hydraulic motors may be driven by a pressurized transmission fluid received from the hydrostatic pump 202. To supply the transmission fluid, the hydrostatic drive 200 includes at least two drive lines.

In an embodiment, the drive lines may include a drum drive line 214 and an axle drive line 216, as illustrated in FIG. 4. The drum drive line 214 is connected to the drum motor 208 and the axle drive line 216 is connected to the axle motor 210. In the present disclosure, both the drum drive line 216 and the axle drive line 216 include a pressure side and a return side. Specifically, the drum drive line 214 may include a drum pressure hose 218 and a drum return hose 220. Similarly, the axle drive line 216 may include an axle pressure hose 222 and an axle return hose 224.

In an embodiment, the drum drive line 216 and the axle drive line 216 may include hoses extending from the hydrostatic pump 202. The drum drive line 216 and the axle drive line 216 may be installed from one end to the hydrostatic pump 202 and from other end to the hydraulic motors. The hydraulic motors may include ports (not illustrated) for installing the drive lines to receive the transmission fluid. The drum drive line 216 and the axle drive line 216 may be adapted to develop pressures independent of each other, based on the rolling radii and the ground conditions at the respective sides.

Typically, a conventional hydrostatic drive includes an external manifold for installing the drive lines. The drive lines may be installed to the external manifold with some connection means. Further, the external manifold may be remotely connected to the hydrostatic pump via some hoses. The connection means may include swivel nut fittings which are screwed to the external manifold. In some cases, the connection means may also include O-ring face seals disposed in between. Such connection means are prone to leakage problem and may result in in-efficient working of the machine 100.

To overcome this, the hydrostatic drive 200 of the present disclosure may couple the drive lines to the hydrostatic pump 202 via an integrally connected manifold 226. In the present disclosure, the manifold 226 is integrally connected to the hydrostatic pump 202. The manifold 226 may be connected to the housing 206 in a manner, such that the manifold 226 forms a portion of the hydrostatic pump 202.

In an embodiment, the manifold 226 may be in contact with a connecting face 227 of the housing 206 of the hydrostatic pump 202. To integrate the manifold 226, a fastening member 228 such as, a nut and a bolt, a bolt and a washer, or the like may be employed. The fastening member 228 may couple the manifold 226 to the housing 206 at the connecting face 227. Further, a seal 230 may be disposed between the manifold 226 and the connecting face 227. The seal 230 may provide a leak-free connection between the manifold 226 and the hydrostatic pump 202.

In the hydrostatic drive 200, the manifold 226 may include a flange 232 to integrally couple the drum drive line 216 and the axle drive line 216 with the hydrostatic pump 202. According to an embodiment, the flange 232 may be of diameter in the range of approximately 0.5 inches to 2 inches. The flange 232 may be coupled to the manifold 226 via a connecting member 233 like nuts and bolts. In an embodiment, the same connecting member 233 may work as the fastening member 228 protruding through the manifold 226 to connect with the housing 206 of the hydrostatic pump 202.

Further, the hydrostatic drive 200 may include a plug orifice 234 allowing for fluid communication between the drum drive line 216 and the axle drive line 216. In an embodiment, the hydrostatic drive 200 may include a plurality of plug orifices for each of the drum drive line 216 and the axle drive line 216. The plug orifice 234 may be screwed to the manifold 226, either where the drum drive line 214 or the axle drive line 216 is installed to the manifold 226. In an alternative embodiment, the hydrostatic drive 200 may include a flow divider/combiner valve of either rotary or spool type in place of the plug orifice 234.

The plug orifice 234 may allow exchange of a fraction of the transmission fluid between the drum drive line 216 and the axle drive line 216 from within the manifold 226. The exchange of the fraction of the transmission fluid takes place due to a pressure difference developed between the drum drive line 214 and the axle drive line 216. This ensures an equal flow ratio of the transmission fluid between the drum motor 208 and the axle motor 210 and result in speed synchronization between the drum 114 and the set of traction wheels 118 in the machine 100.

INDUSTRIAL APPLICABILITY

In operation, the machine 100 may be used for compaction of loose ground having surface of soil or asphalt or the like. For this, the machine 100 with the drum 114 may be rolled over the ground. As the ground becomes compacted, the segmented pads 116 may not be able to penetrate as far into the ground, even to the point of very little penetration at full compaction. In other situation, the segmented pads 116 may sink into the loose ground. Sometimes a further complication may arise as some soil or other residue may get deposited over the set of traction wheels 118.

All these factors may lead to a difference between the rolling radius of drum $R_d$ and the rolling radius of the set of traction wheels $R_w$, which in turn may result in variation between the ground speed of the drum 114 and the set of traction wheels 118. This variation may cause increased drive pressure, hydrostatic braking and slippage of the ground engaging members, leading to wastage of energy and in-efficient operation of the machine 100. Hence, it is the purpose of the present disclosure to provide the hydrostatic drive 200 which ensures equal flow ratio to the drum motor 208 and the axle motor 210, in such situations, and hence provide synchronized ground speed between the drum 114 and the set of fraction wheels 118 respectively.

The hydrostatic drive 200 of the present disclosure may minimize such issues by providing continued propulsion of the machine 100, regardless of the ground conditions and the difference in rolling radii. The present disclosure may provide a method for speed synchronization between the drum motor 208 and the axle motor 210. The method includes integrally connecting the manifold 226 to the hydrostatic pump 202. The method further includes coupling the drum drive line 214 and the axle drive line 216 to the manifold 226 with the flange 232. Finally, the method includes providing the plug orifice 234 in the manifold 226 to enable an exchange of the transmission fluid between the drum drive line 214 and the axle drive line 216.

Figure 5:
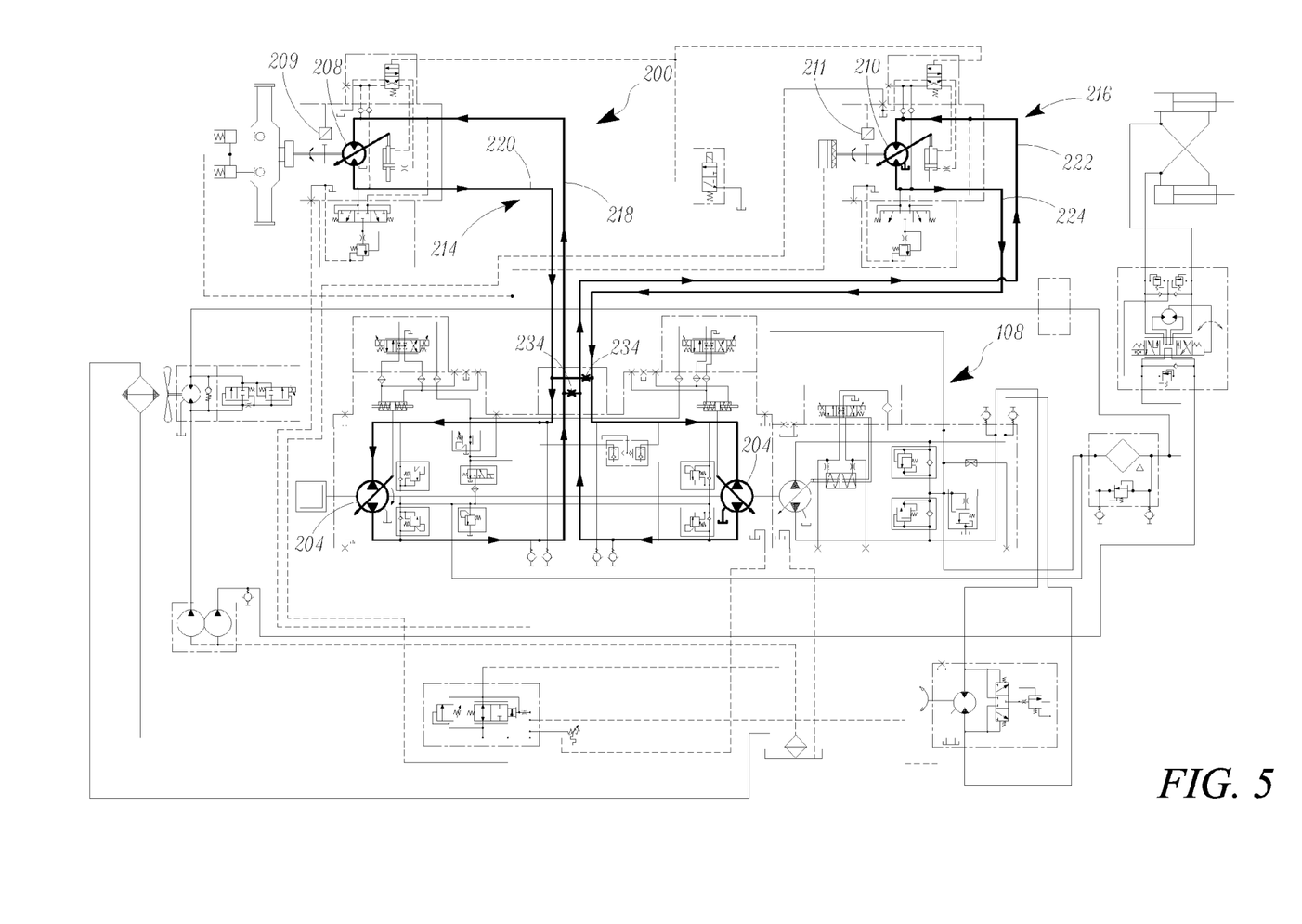
FIG. 5 illustrates a schematic of the hydrostatic drive of FIG. 2.

A schematic illustrating the working of the hydrostatic drive 200 along with the controls 108 is diagrammatically represented in FIG. 5. The power source 102 may provide the power to run the various components, that is, each of the rotary groups 204 and the drum motor 208 and the axle motor 210. The operator may operate the various components by the controls 108. The controls 108 may use the electric proportional means like solenoids. The hydrostatic drive 200 may be configured to supply different amount of transmission fluid to the drum motor 208 and the axle motor 210. The difference in amount of transmission fluid supplied to the drum motor 208 and the axle motor 210 is based at least in part on the operator command from the controls 108.

In the hydrostatic drive 200, the drum drive line 214 and the axle drive line 216 are adapted to develop pressures independent of each other. The developed pressures in the drum drive line 214 and the axle drive line 216 may be a function of the rolling radii $R_d$ and $R_w$ respectively. Due to a difference in the pressure, some fraction of the transmission fluid may be exchanged between the drum drive line 214 and the axle drive line 216. Specifically, the transmission fluid may be exchanged between the drum pressure hose 218 and axle pressure hose 222, and the drum return hose 220 and the axle return hose 224. The exchange of transmission fluid may take place through the plug orifices 234.

Conventionally, the drive lines are remotely routed to the external manifold which couples to the hydrostatic pump 202 by some connection means. Such an arrangement may be prone to leakage of the transmission fluid in the hydrostatic drive 200. To minimize this, the hydrostatic drive 200 of the present disclosure has the manifold 226 integrally connected to the hydrostatic pump 202. The manifold 226 is configured to operatively couple the drum drive line 214 and the axle drive line 216 with the hydrostatic pump 202. The drive lines, that is, the drum drive line 214 having the drum pressure hose 218 and the drum return hose 220, and the axle drive line 216 having the axle pressure hose 222 and the axle return hose 224 are coupled to the manifold 226.

The hydrostatic drive 200 with the drive lines mounted to the hydrostatic pump 202 via the integrally connected manifold 226 provides a compact arrangement. This may eliminate the extra hoses and the connection means required for coupling the manifold 226 to the hydrostatic pump 202. Further, this may also minimize the leakage problem by eliminating the leak-prone connection means.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A hydrostatic drive comprising:
a hydrostatic pump configured to supply a transmission fluid;
an axle motor configured to drive an axle;
a drum motor configured to drive a drum;
an axle drive line connected to the axle motor to supply the transmission fluid from the hydrostatic pump;
a drum drive line connected to the drum motor to supply the transmission fluid from the hydrostatic pump;
a manifold integrally connected to the hydrostatic pump, the manifold is configured to operatively couple the axle drive line and the drum drive line with the hydrostatic pump; and
a plug orifice screwed to the manifold, wherein the plug orifice is configured to provide fluid communication between the axle drive line and the drum drive line.

2. The hydrostatic drive of claim 1, wherein the hydrostatic pump includes two rotary groups disposed in a housing.

3. The hydrostatic drive of claim 2, wherein the manifold is integrally bolted to the housing forming a portion of the hydrostatic pump.

4. The hydrostatic drive of claim 1, wherein the axle drive line includes an axle pressure hose and an axle return hose, and wherein the drum drive line includes a drum pressure hose and a drum return hose.

5. The hydrostatic drive of claim 1, wherein the manifold includes a flange to integrally couple the axle drive line and the drum drive line to the hydrostatic pump.

6. The hydrostatic drive of claim 1, wherein the plug orifice is configured to exchange the transmission fluid between the axle drive line and the drum drive line based on a difference between developed pressures.

7. A machine comprising:
an axle motor connected to an axle for driving a set of traction wheels;
a drum motor drivingly connected to a drum;
a hydrostatic pump configured to supply a transmission fluid;
an axle drive line connected to the axle motor for supplying the transmission fluid from the hydrostatic pump;
a drum drive line connected to the drum motor for supplying the transmission fluid from the hydrostatic pump;
a manifold integrally connected to the hydrostatic pump, the manifold is configured to operatively couple the axle drive line and the drum drive line with the hydrostatic pump; and
a plug orifice configured to exchange the transmission fluid, based on a difference in pressure, between the axle drive line and the drum drive line.

8. The machine of claim 7 is a soil compactor.

9. The machine of claim 7, wherein the drum includes a plurality of segmented pads.

10. The machine of claim 7, wherein the axle drive line includes an axle pressure hose and an axle return hose, and wherein the drum drive line includes a drum pressure hose and a drum return hose.

11. The machine of claim 7 wherein the hydrostatic pump includes two rotary groups disposed in a housing.

12. The machine of claim 11, wherein the manifold is integrally bolted to the housing forming at least a portion of the hydrostatic pump.

13. The machine of claim 7, wherein the manifold includes a flange to integrally couple the axle drive line and the drum drive line to the hydrostatic pump.

14. The machine of claim 7, wherein the plug orifice is screwed to the manifold.

15. A method for speed synchronization between a drum motor and an axle motor in a machine, the method comprising:
- connecting a manifold, integrally, with a hydrostatic pump, the manifold forming at least a portion of a housing of the hydrostatic pump;
- coupling a drum drive line connected to the drum motor and an axle drive line connected to the axle motor to the manifold; and
- providing a plug orifice in the manifold to enable an exchange of a transmission fluid between the axle drive line and the drum drive line.

16. The method of claim 15 further includes configuring the plug orifice to exchange the transmission fluid based on a difference in pressure between the axle drive line and the drum drive line.

* * * * *

UNITED STATES PATENT AND TRADEMARK OFFICE
CERTIFICATE OF CORRECTION

PATENT NO. : 8,935,920 B2  
APPLICATION NO. : 13/291507  
DATED : January 20, 2015  
INVENTOR(S) : Olson et al.

It is certified that error appears in the above-identified patent and that said Letters Patent is hereby corrected as shown below:

In the specification

Column 4, line 64, delete "fraction" and insert -- traction --.

Signed and Sealed this
Twenty-fourth Day of November, 2015

Michelle K. Lee
*Director of the United States Patent and Trademark Office*